(12) United States Patent
Huang et al.

(10) Patent No.: US 11,548,156 B2
(45) Date of Patent: Jan. 10, 2023

(54) DEVICE AND METHOD FOR CALIBRATING COORDINATE SYSTEM OF 3D CAMERA AND ROBOTIC ARM

(71) Applicant: TECHMAN ROBOT INC., Taoyuan (TW)

(72) Inventors: Chung-Hsien Huang, Taoyuan (TW); Shih-Jung Huang, Taoyuan (TW)

(73) Assignee: TECHMAN ROBOT INC., Taoyuan (TW)

( * ) Notice: Subject to any disclaimer, the term of this patent is extended or adjusted under 35 U.S.C. 154(b) by 260 days.

(21) Appl. No.: 17/024,645

(22) Filed: Sep. 17, 2020

(65) Prior Publication Data

US 2022/0080597 A1 Mar. 17, 2022

(51) Int. Cl.
*B25J 9/16* (2006.01)
*B25J 13/08* (2006.01)
*G06T 7/80* (2017.01)

(52) U.S. Cl.
CPC ........... *B25J 9/1692* (2013.01); *B25J 9/1697* (2013.01); *B25J 13/088* (2013.01); *G06T 7/80* (2017.01)

(58) Field of Classification Search
CPC ...... B25J 9/1692; B25J 9/1697; B25J 13/088; G06T 7/80; G05B 19/0426; G05B 2219/37567
See application file for complete search history.

(56) References Cited

U.S. PATENT DOCUMENTS

| | | | |
|---|---|---|---|
| 8,553,942 B2 * | 10/2013 | Lynch | G06T 5/50 382/106 |
| 2015/0010202 A1 * | 1/2015 | Tuzel | G06T 7/75 382/103 |
| 2015/0206023 A1 * | 7/2015 | Kochi | G01B 11/00 382/199 |
| 2016/0039096 A1 * | 2/2016 | Wallack | G06T 7/80 901/9 |
| 2019/0122425 A1 * | 4/2019 | Sheffield | H04N 13/243 |
| 2020/0122332 A1 * | 4/2020 | Harada | B25J 9/1692 |
| 2020/0156251 A1 * | 5/2020 | Huang | B25J 9/1692 |
| 2022/0048199 A1 * | 2/2022 | Heidemann | B25J 13/089 |

* cited by examiner

*Primary Examiner* — Molly Wilburn
(74) *Attorney, Agent, or Firm* — Winston Hsu

(57) ABSTRACT

A calibration device for a 3D (three dimensional) camera and a robotic arm includes three plates with fixed relative positions and non-parallel separation disposed on a mount. Three spatial planes extending from the three plates intersect at a positioning point for external parameter correction. A calibration method for coordinates of a 3D (three dimensional) camera and a robotic arm using the calibration device is also specified in detail.

8 Claims, 8 Drawing Sheets

DEVICE AND METHOD FOR CALIBRATING COORDINATE SYSTEM OF 3D CAMERA AND ROBOTIC ARM

BACKGROUND OF THE INVENTION

1. Field of the Invention

The present invention is related to a 3D camera and robotic arm system, particularly to a device and method for calibrating coordinate system of a 3D camera and a robotic arm.

2. Description of the Prior Art

With the rapid development of artificial intelligence, factories use 3D (three dimensional) cameras and robotic arms in automated assembly and manufacturing operations to improve factory production efficiency. The precision of the coordinate system of the 3D camera and the coordinate system of the robotic arm affects the precision of factory production.

FIG. 8 shows the calibration of a robotic arm 1 and a 3D camera 3 of the prior art. The robotic arm 1 forms an arm coordinate system R on the base 2. A 3D camera 3 is installed in the working environment of the robotic arm 1 to forma camera coordinate system C for automated assembly and manufacturing. When the camera coordinate system C and the arm coordinate system R are calibrated, a calibration device 4 is required to calibrate the 3D camera 3. When installing the 3D camera 3, the user needs to set the calibration device 4 in the working environment of the robotic arm 1, and let the calibration device 4 appear in the field of view of the 3D camera 3.

The 3D camera 3 is also called depth camera. Depending on the principle, it may also obtain 2D (two dimensional) information such as RGB color information or monochrome grayscale information for identifying the calibration device 4. If the 3D camera 3 does not capture color information, or the 2D information is insufficient for precise identification and positioning, the 3D information of the shape feature of the calibration device 4 is used for calibration. The 3D information comprises two kinds of information: depth map or point cloud image. The depth map and the point cloud image can be produced through internal parameters of the 3D camera 3. The 3D camera 3 captures the 3D information of the calibration device 4 to form the spatial position information of the calibration device 4 in the camera coordinate system C. The shape feature of the correction device is analyzed, and the edge and corner points are used as the positioning points K1-K5 for calibrating the robotic arm 1 and the 3D camera 2. When the known positioning points K1-K5 are under the camera coordinate system C, and the center point of the tool 5 on the robotic arm 1 touches the positioning points K1-K5, the arm coordinate system R and the camera coordinate system C can be calibrated.

However, the 3D information of the 3D camera 3 is more precise in the center part of the field of view of the 3D camera. When using the aforementioned method to perform coordinate system calibration, precise edge position information of the calibration device 4 cannot be easily obtained. When the surface slope of the calibration device 4 changes greatly, the precision of the edge position information will also decrease, resulting in imprecise positioning points K1-K5 at the edge corners.

SUMMARY OF THE INVENTION

The embodiment provides a calibration device for a 3D (three dimensional) camera and a robotic arm. The calibration device comprises three plates with fixed relative positions and non-parallel separation disposed on a mount, wherein three spatial planes extending from the three plates intersect at a positioning point for external parameter correction.

The embodiment provides a calibration method for coordinates of a 3D (three dimensional) camera and a robotic arm. The method comprises disposing a calibration device with three plates in a working environment of the robotic arm and a field of view of the 3D camera, capturing point cloud data of the calibration device with the 3D camera to generate a point cloud image, calculating a Z value difference and a vector angle of each set of adjacent point clouds according to the point cloud image, grouping the point cloud data according to the Z value difference and the vector angle to form point cloud groups, eliminating a set of point cloud groups with fewer point clouds to form three point cloud groups, establishing three plane equations by a least square method, calculating an intersection point of the three plane equations according to a three-plane intersection formula, and correcting external parameters by using the intersection point as a positioning point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
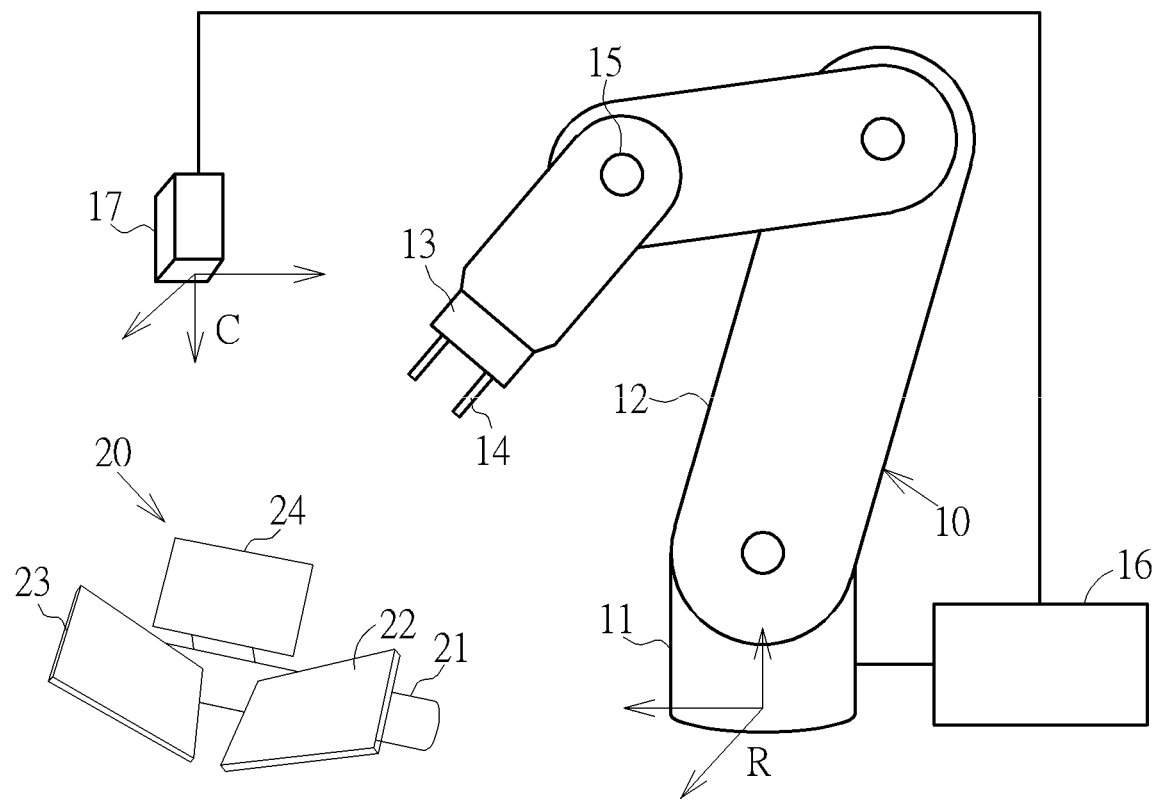
FIG. 1 is a diagram illustrating a working environment for calibration of a robotic arm and a 3D camera.
Figure 2:
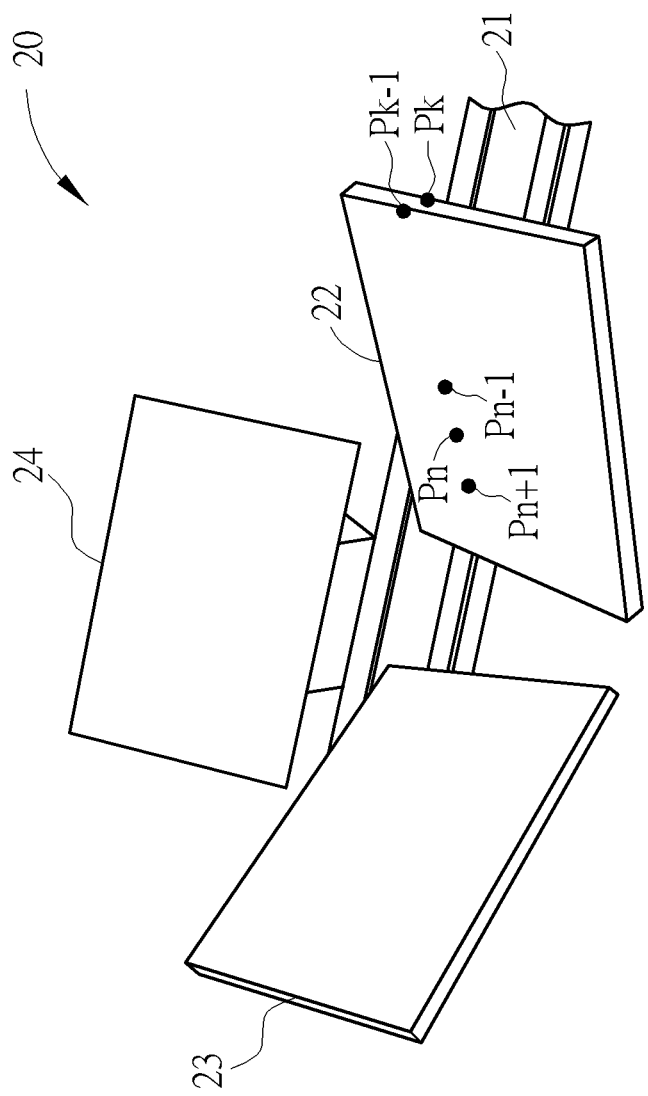
FIG. 2 is a point cloud image of the calibration device of FIG. 1.
Figure 3:
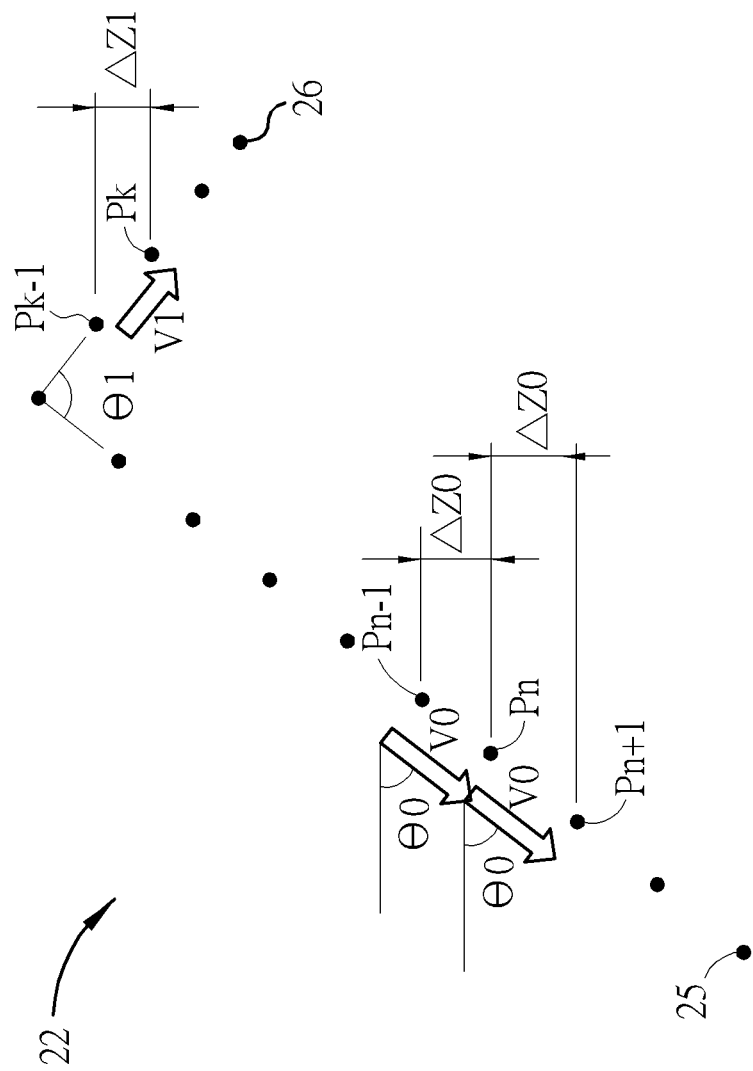
FIG. 3 is a diagram illustrating point cloud groups forming the three planes of FIG. 2.
Figure 4:
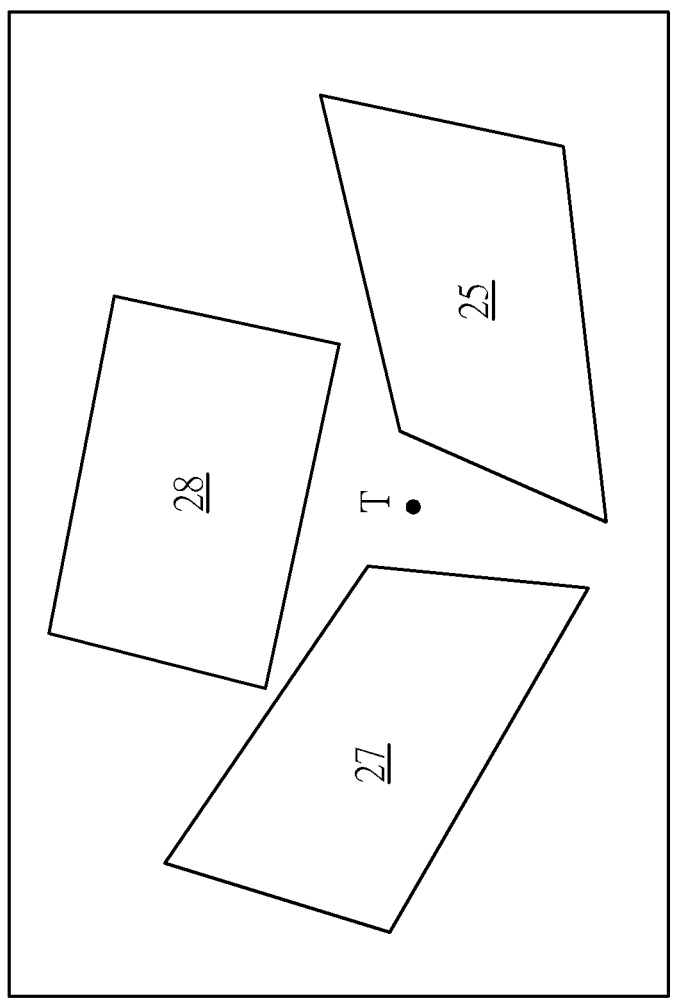
FIG. 4 is a diagram illustrating the calibration positioning point formed by the intersection of the three planes of FIG. 2.

Please refer to FIGS. 1 to 4. FIG. 1 is a diagram illustrating a working environment for calibration of a robotic arm and a 3D camera. FIG. 2 is a point cloud image of the calibration device 20 of FIG. 1. FIG. 3 is a diagram illustrating point cloud groups forming the three planes of FIG. 2. FIG. 4 is a diagram illustrating the calibration positioning point formed by the intersection of the three planes of FIG. 2.

In FIG. 1, one end of the robotic arm 10 is fixed on a base 11. A plurality of shafts 12 are connected to form a movable end 13 on the other end of the robotic arm 10. A tool 14 is disposed on the movable end 13 and an actuator motor 15 is disposed on each shaft 12 to a control device 16. The robotic arm 10 controls the rotation angle of the actuator motor 15 of each shaft 12 via the control device 16 to move the tool 14. The robotic arm 10 takes the base 11 as the reference point to form an arm coordinate system R of the robotic arm 10. Using the length of the tool 14 and the rotation angle of the actuator motor 15, the control device 16 can calculate the moving position of the tool 14 in the arm coordinate system R to precisely control the tool 14.

A 3D camera 17 is disposed in the working environment of the robotic arm 10. The 3D camera 17 has a camera coordinate system C. The information captured by the 3D camera 17 is transferred to the control device 16 for processing. However, the positional relationship of the camera coordinate system C with respect to the arm coordinate system R is unknown. The conversion and calibration between the camera coordinate system C and the arm coordinate system R are required to integrate the 3D camera 17 and the robotic arm 10.

To calibrate the robotic arm 10 with the 3D camera 17, firstly the calibration device 20 is disposed in the working environment of the robotic arm 10 and the calibration device 20 is within the field of view of the 3D camera 17. In the calibration device 20, three plates 22, 23 and 24 are disposed on the mount 21 in their relative positions and are separated from each other in unparalleled positions. The three spatial planes extending from the three plates 22, 23, 24 intersect at a single point as the exterior positioning point for parameter calibration.

The coordinates of the intersection point of the three spatial planes must be obtained through calculation. First, the 3D camera 17 can capture the 3D information of the calibration device 20, shown in FIG. 2, to obtain the point cloud image of the calibration device 20. Although the point cloud image is taken as an example in this embodiment, the 3D information includes but not limited to point cloud images. In some other embodiments, a depth map is also applicable. In order to confirm the position of the point cloud image of the three flat plates 22, 23 and 24 of the calibration device 20, a Z value difference between adjacent point clouds and a vector angle θ0 is calculated according to the coordinates (x, y, z) of each point cloud of the point cloud image captured by the 3D camera 17 in the camera coordinate system C. The Z value difference is the difference between the Z-axis coordinates of the adjacent point clouds in the camera coordinate system C, and the vector angle θ0 is the angle between the horizontal or vertical axis of the position vector V0 of the adjacent point clouds and the 3D camera 17.

Taking the point cloud image of the plate 22 as an example, in FIG. 3, the point cloud of the side face of the plate 22 and the adjacent point clouds Pn−1, Pn, Pn+1 on a plane 25 (the front face of the plate 22) are shown. The resolution of the point cloud image is set by the 3D camera 17 so the resolution for each plate is fixed. The slope of the plane 25 is constant. The Z-axis difference ΔZ0 between adjacent point clouds Pn−1 and Pn is the same as that of Pn and Pn+1. Therefore, the Z value differences between adjacent point clouds on the same plane should be the same. For the same reason, the direction and the magnitude of a position vector V0 formed by adjacent point clouds Pn−1 and Pn should be the same as the position vector V0 formed by Pn and Pn+1. The vector angle θ0 of the position vector V0 on the plane 25 in the camera coordinate system C should also be constant. It means that the vector angles of different sets of adjacent point clouds on the same plane of the plate should be the same. Hence, the Z value differences of different sets of adjacent point clouds on the same plane should be the same, and the vector angles of position vectors formed by different sets of adjacent point clouds on the same plane should be the same. As for the adjacent point clouds Pk−1 and Pk on a side face 26 of the plate 22, because the slope of the side face 26 is different from that of the plane 25, the Z value difference ΔZ1 and the vector angle θ1 of the position vector V1 on the side face 26 are different from the Z value difference ΔZ0 and the vector angle θ0 of the position vector V0. Therefore, the point clouds can be grouped to form point cloud groups according to Z value differences and vector angles.

As shown in FIG. 4, the point cloud groups with fewer point clouds (on the side face 26) can be discarded, and the point cloud groups on the plane 25 can be selected and identified. In the same way, the point cloud groups on planes 27 and 28 of the plates 23 and 24 respectively can also be identified.

Figure 5:
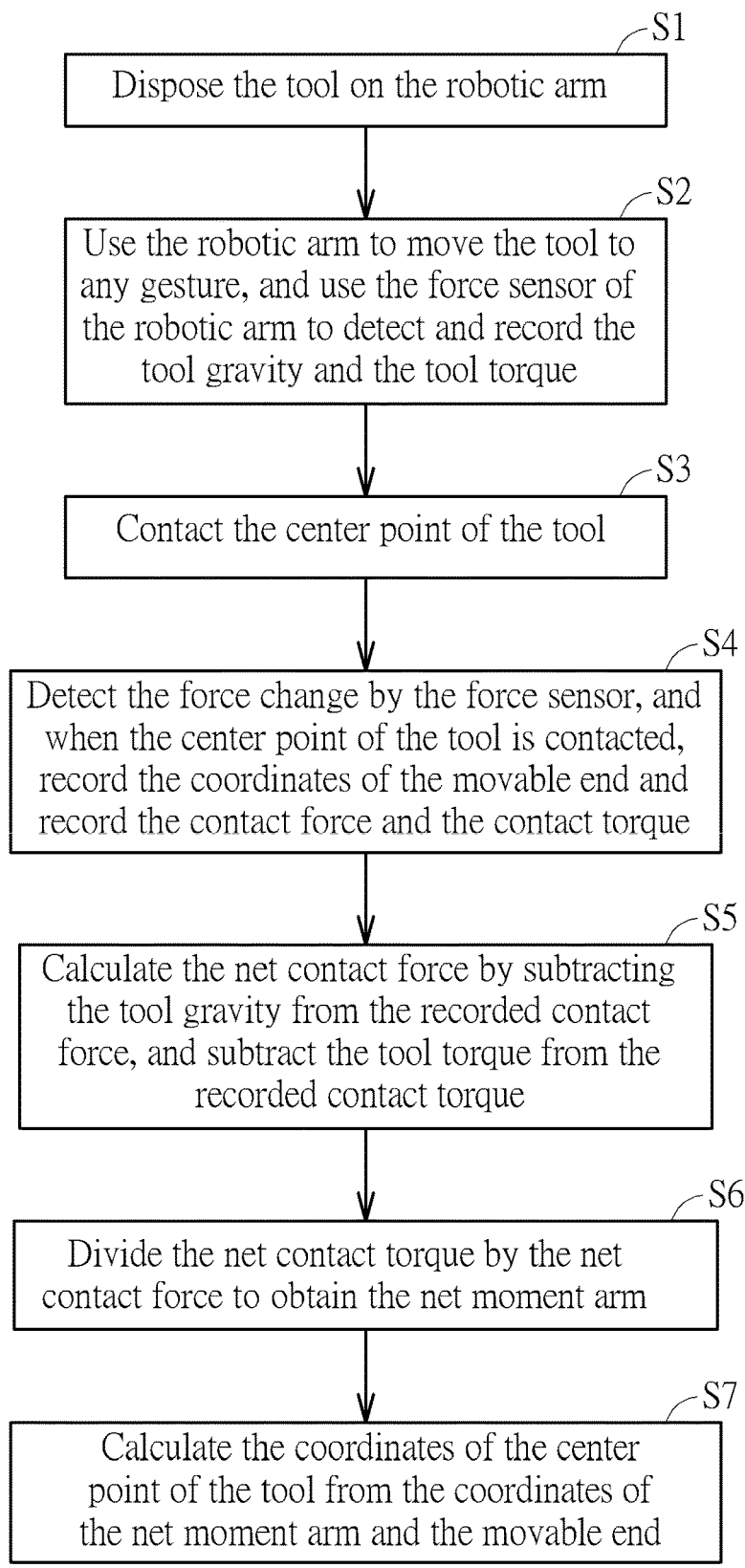
FIG. 5 is a flowchart of the method for calibrating the center point of the tool on the robotic arm of FIG. 1.

FIG. 5 is a flowchart of the method for calibrating the center point of the tool 14 on the robotic arm 10. The method includes the following steps:

S1: Dispose the tool 14 on the robotic arm 10;

S2: Use the robotic arm 10 to move the tool 14 to any gesture, and use the force sensor of the robotic arm 10 to detect and record the tool gravity and the tool torque;

S3: Contact the center point of the tool 14;

S4: Detect the force change by the force sensor, and when the center point of the tool 14 is contacted, record the coordinates of the movable end 13 and record the contact force and the contact torque;

S5: Calculate the net contact force by subtracting the tool gravity from the recorded contact force, and subtract the tool torque from the recorded contact torque;

S6: Divide the net contact torque by the net contact force to obtain the net moment arm; and S7: Calculate the coordinates of the center point of the tool 14 from the coordinates of the net moment arm and the movable end 13.

Using the point cloud groups on the planes 25, 27, and 28 of their respective plates 22, 23, and 24, the plane equations of the planes 25, 27, and 28 can be expressed using the conventional least square method, respectively. The plane equation of each plane can be expressed as:

$$z = Ax + By + C$$

$$A = \frac{(\overline{zx} - \bar{z}\bar{x})(\overline{y^2} - \bar{y}^2) - (\overline{zy} - \bar{z}\bar{y})(\overline{xy} - \bar{x}\bar{y})}{(\overline{x^2} - \bar{x}^2)(\overline{y^2} - \bar{y}^2) - (\overline{xy} - \bar{x}\bar{y})^2}$$

$$B = \frac{(\overline{zy} - \bar{z}\bar{y})(\overline{x^2} - \bar{x}^2) - (\overline{zx} - \bar{z}\bar{x})(\overline{xy} - \bar{x}\bar{y})}{(\overline{x^2} - \bar{x}^2)(\overline{y^2} - \bar{y}^2) - (\overline{xy} - \bar{x}\bar{y})^2}$$

$$C = \bar{z} - A\bar{x} - B\bar{y}$$

$\bar{x}$ is an average value of x coordinates of the point cloud groups. $\bar{y}$ is an average value of y coordinates of the point cloud groups. $\bar{z}$ is an average value of z coordinates of the point cloud groups. $\overline{zx}$ is an average value of the z coordinates multiplied by the respective x coordinates of the point cloud groups. $\overline{zy}$ is an average value of the z coordinates multiplied by the respective y coordinates of the point cloud groups. $\overline{xy}$ is an average value of the x coordinates multiplied by the respective y coordinates of the point cloud groups.

The plane equations of the planes 25, 27, and 28 can be rewritten as:

$$a_1x + b_1y + c_1z + d_1 = 0$$

$$a_2x + b_2y + c_2z + d_2 = 0$$

$$a_3x + b_3y + c_3z + d_3 = 0$$

By calculating the planes intersection, the result can be obtained as:

$$x = \frac{\begin{vmatrix} d_1 & b_1 & c_1 \\ d_2 & b_2 & c_2 \\ d_3 & b_3 & c_3 \end{vmatrix}}{-Det},\ y = \frac{\begin{vmatrix} a_1 & d_1 & c_1 \\ a_2 & d_2 & c_2 \\ a_3 & d_3 & c_3 \end{vmatrix}}{-Det},\ z = \frac{\begin{vmatrix} a_1 & b_1 & d_1 \\ a_2 & b_2 & d_2 \\ a_3 & b_3 & d_3 \end{vmatrix}}{-Det}$$

wherein $$Det = \begin{vmatrix} a_1 & b_1 & c_1 \\ a_2 & b_2 & c_2 \\ a_3 & b_3 & c_3 \end{vmatrix}$$

and Det≠0

The present invention uses the most precise 3D information from the center part of the field of view of the 3D camera 17 to calculate the intersection point T of the three planes 25, 27, 28 in the camera coordinate system C as the positioning point T for calibrating the robotic arm 10. After the positioning point T is established, an example is given to illustrate the calibration method using the aforementioned positioning point T, but the method is not limited to the example.

Figure 6:
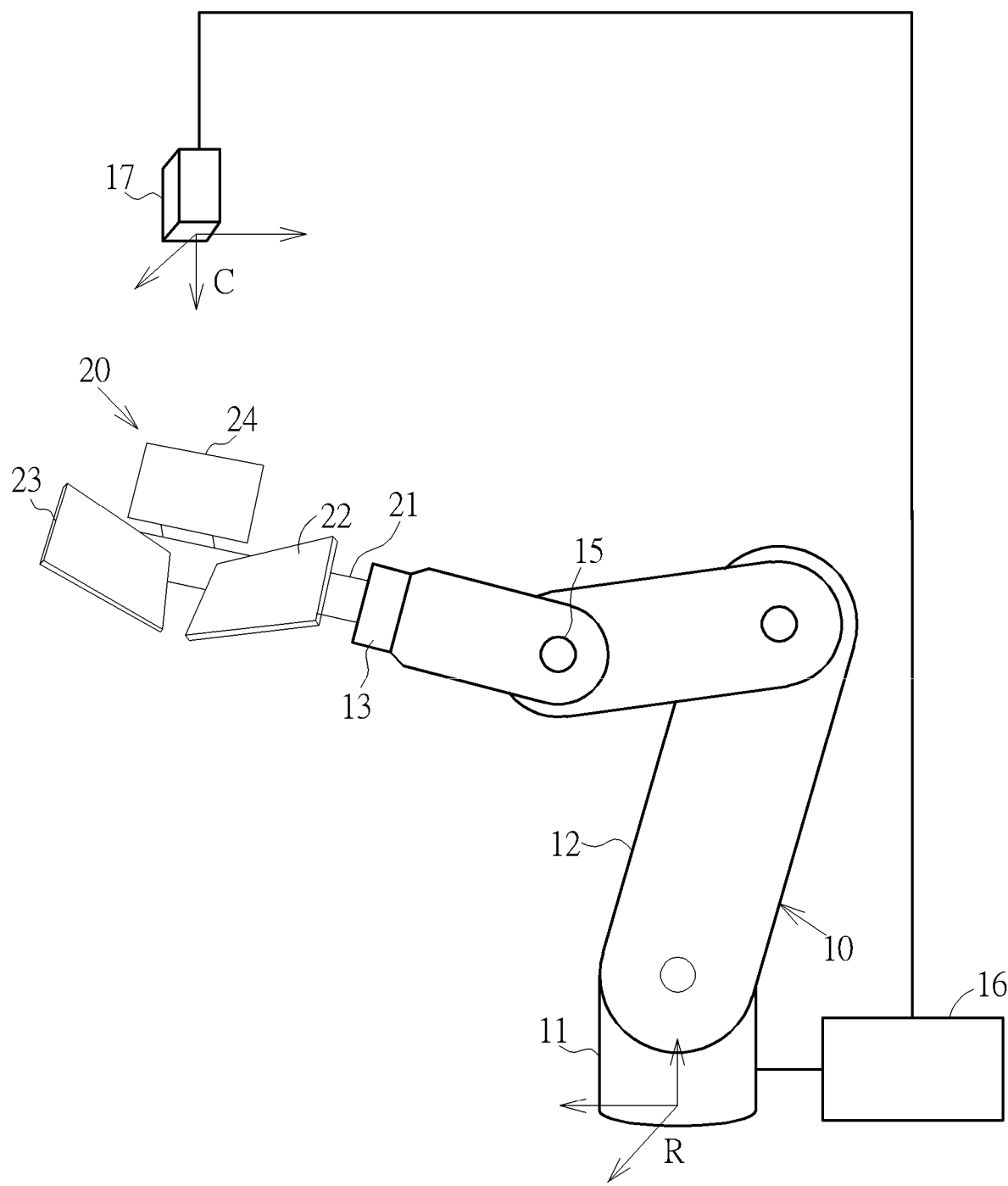
FIG. 6 is a diagram illustrating the calibration device disposed on the robotic arm of FIG. 1.

FIG. 6 is a diagram illustrating the calibration device 20 disposed on the robotic arm 10. A mount 21 of the calibration device 20 can be mounted on the movable end 13 of the robotic arm 10, so that the calibration device 20 and the robotic arm 10 maintain a relatively fixed position. The coordinates of the positioning point formed by the calibration device in the arm coordinate system R can be determined. The robotic arm 10 can then be controlled to move the calibration device 20 a few points in the field of view of the 3D camera 17. The 3D camera 17 uses the aforementioned method to obtain each positioning point in the camera coordinate system C to establish the relationship between the camera coordinate system C and the arm coordinate system R.

Figure 7:
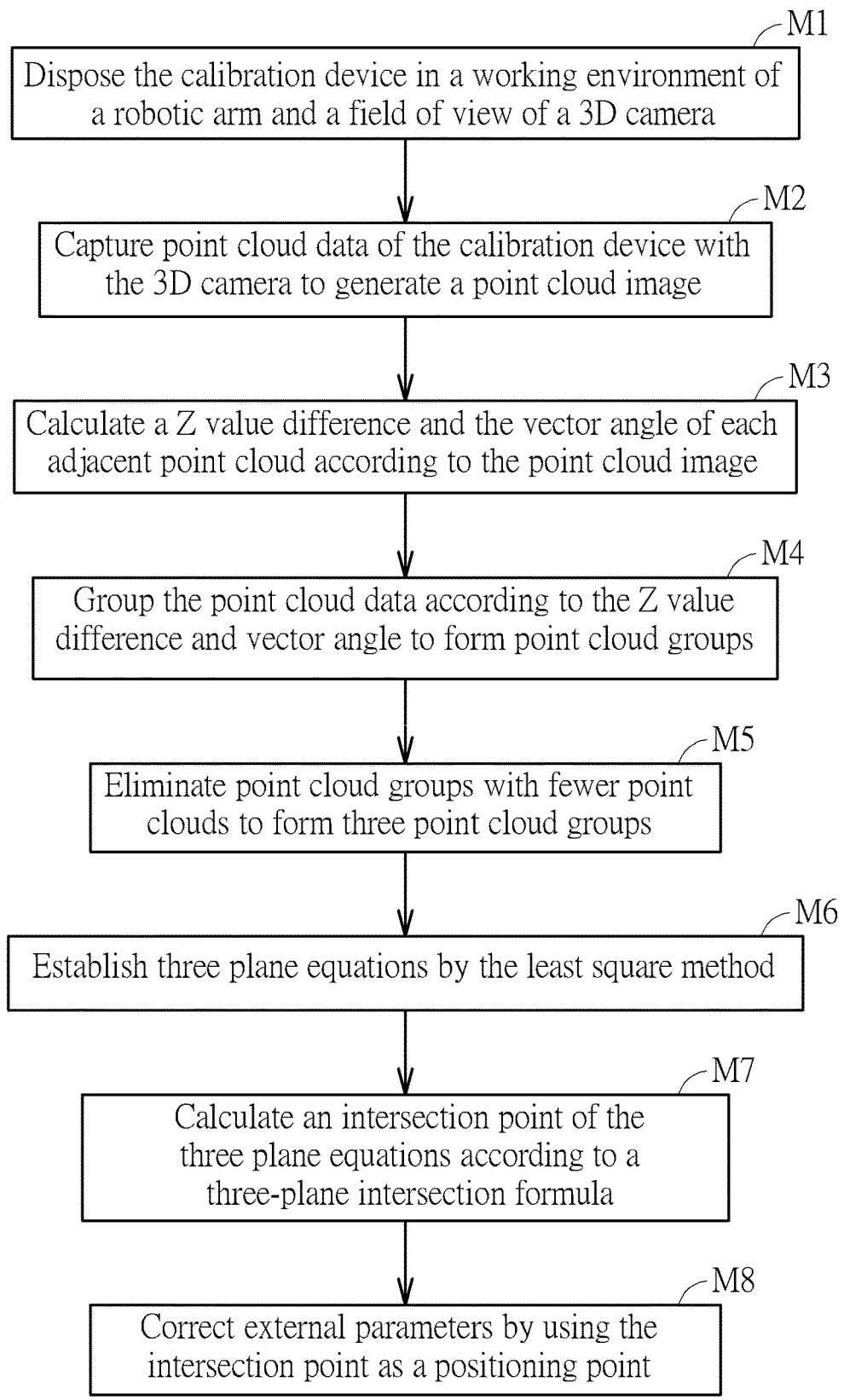
FIG. 7 is a flow chart of the calibration method for coordinates of the 3D camera and the robotic arm of FIG. 5.
Figure 8:
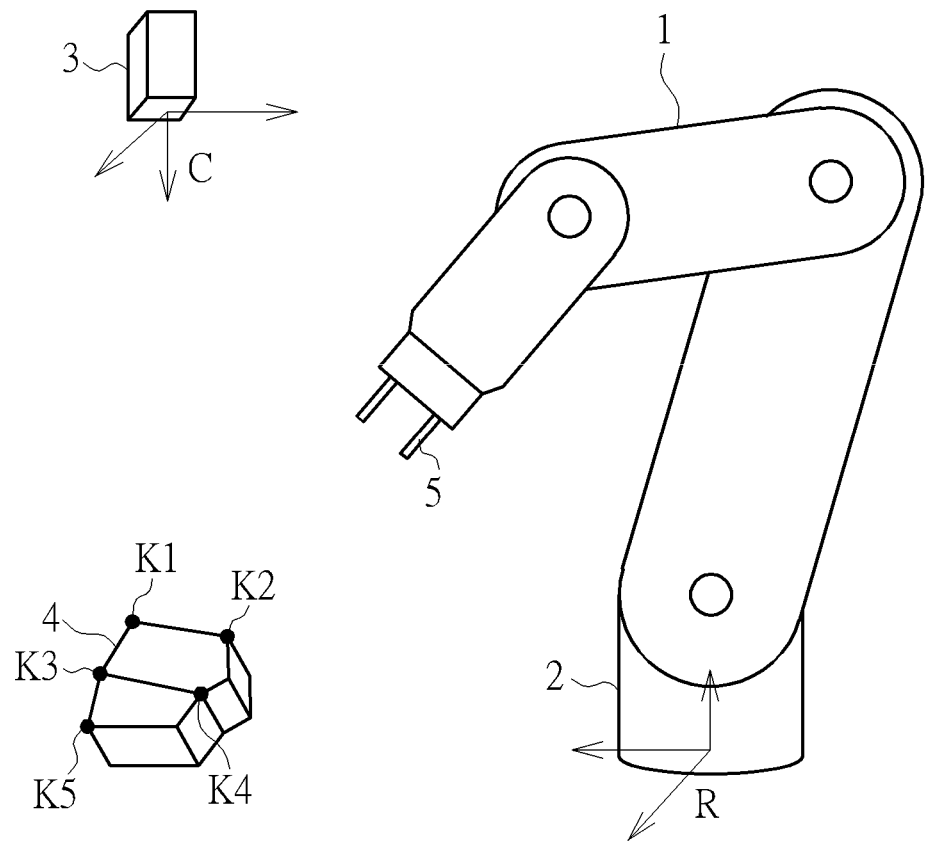
FIG. 8 is a diagram illustrating the calibration of a robotic arm and a 3D camera of the prior art.

FIG. 7 is a flow chart of the calibration method for coordinates of the 3D camera 17 and the robotic arm 10 of FIG. 5. The method includes the following steps:

M1: Dispose the calibration device 20 in a working environment of a robotic arm and a field of view of a 3D camera 17;

M2: Capture point cloud data of the calibration device with the 3D camera to generate a point cloud image;

M3: Calculate a Z value difference and the vector angle of each adjacent point cloud according to the point cloud image;

M4: Group the point cloud data according to the Z value differences and the vector angles to form point cloud groups;

M5: Eliminate a set of point cloud groups with fewer point clouds to form three point cloud groups;

M6: Establish three plane equations by the least square method;

M7: Calculate an intersection point of the three plane equations according to a three-plane intersection formula; and M8: Correct external parameters by using the intersection point as a positioning point.

Since the embodiment uses the 3D information from the most precise part of the 3D camera to directly calculate the positioning point, it can reduce the error and cost of the instrument calibration. Also it can avoid deformation of the edge shape of the calibration device, so as to improve the precision of the positioning point.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for coordinates of a 3D (three dimensional) camera and a robotic arm, comprising:
   disposing a calibration device with three plates in a working environment of the robotic arm and a field of view of the 3D camera;
   capturing point cloud data of the calibration device with the 3D camera to generate a point cloud image;
   calculating a Z value difference and a vector angle of each set of adjacent point clouds according to the point cloud image;
   grouping the point cloud data according to the Z value difference and the vector angle to form point cloud groups;
   eliminating a set of point cloud groups with fewer point clouds to form three point cloud groups;
   establishing three plane equations by a least square method;
   calculating an intersection point of the three plane equations according to a three-plane intersection formula; and
   correcting external parameters by using the intersection point as a positioning point.

2. The method of claim 1, wherein the point cloud data is converted using a 3D information depth map with internal parameters of the 3D camera.

3. The method of claim 1, wherein the Z value difference is a difference between z-axis coordinates of the set of adjacent point clouds in a coordinate system of the 3D camera.

4. The method of claim 3, wherein the vector angle is an angle between a position vector formed by the set of adjacent point clouds and a horizontal or a vertical axis in the coordinate system of the 3D camera.

5. The method of claim 4, wherein the resolution of the point cloud image is set by the 3D camera, the slope of a plane of each plate is constant, differences between the z-axis coordinates of different sets of adjacent point clouds on the plane in the camera coordinate system are the same, the Z value differences of different sets of adjacent point clouds on the plane are the same, and the vector angles of different sets of adjacent point clouds on the plane are the same.

6. The method of claim 1, wherein the least square method comprises a plane equation:

$$z = Ax + By + C$$

$$A = \frac{(\overline{zx} - \overline{z}\,\overline{x})(\overline{y^2} - \overline{y}^2) - (\overline{zy} - \overline{z}\,\overline{y})(\overline{xy} - \overline{x}\,\overline{y})}{(\overline{x^2} - \overline{x}^2)(\overline{y^2} - \overline{y}^2) - (\overline{xy} - \overline{x}\,\overline{y})^2}$$

$$B = \frac{(\overline{zy} - \overline{z}\,\overline{y})(\overline{x^2} - \overline{x}^2) - (\overline{zx} - \overline{z}\,\overline{x})(\overline{xy} - \overline{x}\,\overline{y})}{(\overline{x^2} - \overline{x}^2)(\overline{y^2} - \overline{y}^2) - (\overline{xy} - \overline{x}\,\overline{y})^2}$$

$$C = \overline{z} - A\overline{x} - B\overline{y};$$

wherein:

$\bar{x}$ is an average value of x coordinates of the point cloud groups;

$\bar{y}$ is an average value of y coordinates of the point cloud groups;

$\bar{z}$ is an average value of z coordinates of the point cloud groups;

$\overline{zx}$ is an average value of the z coordinates multiplied by the respective x coordinates of the point cloud groups;

$\overline{zy}$ is an average value of the z coordinates multiplied by the respective y coordinates of the point cloud groups; and $\overline{xy}$ is an average value of the x coordinates multiplied by the respective y coordinates of the point cloud groups.

7. The method of claim 1, wherein the three plane equation comprises:

$$a_1 x + b_1 y + c_1 z + d_1 = 0$$
$$a_2 x + b_2 y + c_2 z + d_2 = 0$$
$$a_3 x + b_3 y + c_3 z + d_3 = 0$$

$$x = \frac{\begin{vmatrix} d_1 & b_1 & c_1 \\ d_2 & b_2 & c_2 \\ d_3 & b_3 & c_3 \end{vmatrix}}{-Det}, y = \frac{\begin{vmatrix} a_1 & d_1 & c_1 \\ a_2 & d_2 & c_2 \\ a_3 & d_3 & c_3 \end{vmatrix}}{-Det}, z = \frac{\begin{vmatrix} a_1 & b_1 & d_1 \\ a_2 & b_2 & d_2 \\ a_3 & b_3 & d_3 \end{vmatrix}}{-Det}$$

wherein $$Det = \begin{vmatrix} a_1 & b_1 & c_1 \\ a_2 & b_2 & c_2 \\ a_3 & b_3 & c_3 \end{vmatrix}$$

and $Det \neq 0$.

8. The method of claim 1, further comprising:

disposing the calibration device on the robotic arm;

controlling the robotic arm to move the calibration device in the field of view of the 3D camera;

obtaining positioning points relative to the camera coordinates through the 3D camera; and calibrating coordinates of the 3D camera and the robotic arm according to the positioning points.

\* \* \* \* \*